(12) United States Patent
Fong et al.

(10) Patent No.: US 10,011,345 B2
(45) Date of Patent: *Jul. 3, 2018

(54) BRAIDED COMPOSITE SPAR

(71) Applicant: AIRBUS OPERATIONS LIMITED, Bristol (GB)

(72) Inventors: Tony Fong, Bristol (GB); Timothy Axford, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 171 days.

This patent is subject to a terminal disclaimer.

(21) Appl. No.: 14/784,960

(22) PCT Filed: Apr. 17, 2014

(86) PCT No.: PCT/GB2014/051228
§ 371 (c)(1),
(2) Date: Oct. 16, 2015

(87) PCT Pub. No.: WO2014/170692
PCT Pub. Date: Oct. 23, 2014

(65) Prior Publication Data
US 2016/0075426 A1 Mar. 17, 2016

(30) Foreign Application Priority Data

Apr. 18, 2013 (GB) .................................. 1307066.9

(51) Int. Cl.
*B64C 3/18* (2006.01)
*B64C 23/06* (2006.01)
(Continued)

(52) U.S. Cl.
CPC ............ *B64C 3/185* (2013.01); *B29C 70/222* (2013.01); *B29C 70/30* (2013.01); *B29C 70/32* (2013.01);
(Continued)

(58) Field of Classification Search
CPC ..... B64C 3/185; B64C 23/065; B64C 27/463; B64C 27/473; B64F 5/10;
(Continued)

(56) References Cited

U.S. PATENT DOCUMENTS 2,709,973 A * 6/1955 Meyer .................... B61D 17/08
105/401
3,339,333 A * 9/1967 Kovalcik ............ E04F 13/0864
29/412
(Continued)

FOREIGN PATENT DOCUMENTS

CN 101758923 A 6/2010
CN 101767646 A 7/2010
(Continued)

OTHER PUBLICATIONS

Examination and Search Report dated Oct. 10, 2016 Chinese Application No. 201480021895.5.
(Continued)

*Primary Examiner* — Joseph W Sanderson
(74) *Attorney, Agent, or Firm* — Hauptman Ham, LLP

(57) ABSTRACT

A braided composite spar or preform for a braided composite spar, comprising a plurality of tubular plies of braided fibers, wherein the spar or preform extends lengthwise from a root to a tip, and the spar or preform has a tapered portion in which each ply has a height which reduces and a width which increases as it extends toward the tip. The spar or preform can be used to provide a tubular main spar for a winglet. The winglet also has a front spar with a front spar web, an upper front spar cap, and a lower front spar cap. An upper skin of the winglet is joined to the braided spar and the upper front spar cap. A lower skin of the winglet is joined to the braided spar and the lower front spar cap.

13 Claims, 14 Drawing Sheets

(51) Int. Cl.
  *B64F 5/10*    (2017.01)
  *B29C 70/22*   (2006.01)
  *B29C 70/32*   (2006.01)
  *B29C 70/30*   (2006.01)
  *B32B 38/18*   (2006.01)
  *B29L 31/30*   (2006.01)

(52) U.S. Cl.
  CPC ........ *B32B 38/1866* (2013.01); *B64C 23/069* (2017.05); *B64F 5/10* (2017.01); *B29L 2031/3085* (2013.01); *B32B 2305/72* (2013.01); *Y02T 50/164* (2013.01); *Y02T 50/433* (2013.01)

(58) Field of Classification Search
  CPC ......... Y10T 29/49337; Y10T 29/49801; Y10T 428/24479; B23P 15/04; B32B 3/00; B32B 2255/02; B32B 2260/02; B29C 70/222; B29C 70/30; B29C 70/32; B29C 70/40; B29C 70/42
  See application file for complete search history.

(56) References Cited

U.S. PATENT DOCUMENTS

| | | | |
|---|---|---|---|
| 4,242,160 A | 12/1980 | Pinter et al. | |
| 4,519,290 A | 5/1985 | Inman et al. | |
| 4,565,595 A * | 1/1986 | Whitener | B29C 70/08 156/156 |
| 4,621,980 A | 11/1986 | Reavely et al. | |
| 4,789,416 A * | 12/1988 | Ford | B29C 70/345 156/222 |
| 5,269,657 A * | 12/1993 | Garfinkle | B29C 70/20 244/124 |
| 5,320,494 A * | 6/1994 | Reinfelder | B64C 27/463 156/701 |
| 5,407,153 A | 4/1995 | Kirk et al. | |
| 5,419,965 A * | 5/1995 | Hampson | B21B 1/095 106/644 |
| 5,421,128 A | 6/1995 | Sharpless et al. | |
| 5,580,627 A | 12/1996 | Goodwin et al. | |
| 5,993,941 A | 11/1999 | Vasiliev et al. | |
| 6,513,757 B1 * | 2/2003 | Amaoka | B64C 3/00 244/117 R |
| 6,743,504 B1 | 6/2004 | Allen et al. | |
| 7,165,945 B2 | 1/2007 | Kovalsky et al. | |
| 7,246,998 B2 * | 7/2007 | Kovalsky | B64C 27/463 416/210 R |
| 7,695,249 B2 * | 4/2010 | Krauss | B64C 27/10 416/134 A |
| 7,762,785 B2 * | 7/2010 | Leahy | B64C 27/463 416/226 |
| 7,828,246 B2 * | 11/2010 | Ashton | B64C 3/185 244/123.9 |
| 7,975,965 B2 | 7/2011 | Ackermann et al. | |
| 8,061,253 B2 | 11/2011 | Wybrow | |
| 8,544,800 B2 * | 10/2013 | Stuhr | B64C 23/065 244/124 |
| 8,864,075 B2 * | 10/2014 | Gray | B29C 70/30 244/119 |
| 8,945,161 B2 | 2/2015 | Miloslavski et al. | |
| 9,145,203 B2 * | 9/2015 | Campbell, Jr. | B64C 23/065 |
| 9,469,391 B1 * | 10/2016 | Dong | B64C 3/385 |
| 9,499,255 B2 * | 11/2016 | Chaussee | B64C 23/065 |
| 9,527,575 B2 * | 12/2016 | Moselage, III | B64C 3/185 |
| 9,896,186 B2 * | 2/2018 | Fong | B64C 3/185 |
| 2005/0042109 A1 | 2/2005 | Kovalsky et al. | |
| 2006/0104812 A1 * | 5/2006 | Kovalsky | B64C 27/463 416/87 |
| 2007/0018049 A1 | 1/2007 | Stuhr | |
| 2008/0131280 A1 * | 6/2008 | Krauss | B64C 27/10 416/131 |
| 2009/0072088 A1 * | 3/2009 | Ashton | B64C 3/185 244/124 |
| 2009/0148302 A1 * | 6/2009 | Leahy | B64C 27/463 416/224 |
| 2009/0283639 A1 | 11/2009 | Ackermann et al. | |
| 2010/0170989 A1 * | 7/2010 | Gray | B29C 70/30 244/123.1 |
| 2010/0170990 A1 | 7/2010 | Wybrow | |
| 2010/0178453 A1 | 7/2010 | Wood | |
| 2011/0076149 A1 * | 3/2011 | Santiago | F03D 1/0675 416/223 R |
| 2011/0135487 A1 * | 6/2011 | Rao | F03D 1/0641 416/233 |
| 2011/0224707 A1 | 9/2011 | Miloslavski et al. | |
| 2011/0226407 A1 * | 9/2011 | Inserra Imparato | B29C 70/44 156/196 |
| 2012/0052247 A1 | 3/2012 | Pook et al. | |
| 2012/0112005 A1 | 5/2012 | Chaussee et al. | |
| 2012/0305173 A1 | 12/2012 | Masson et al. | |
| 2013/0129507 A1 * | 5/2013 | Moselage, III | B64C 11/26 416/1 |
| 2013/0139961 A1 | 6/2013 | Gear et al. | |
| 2014/0113107 A1 | 4/2014 | Kremer | |
| 2014/0117166 A1 * | 5/2014 | Campbell, Jr. | B64C 23/065 244/199.4 |
| 2014/0145032 A1 * | 5/2014 | Moselage, III | B64C 3/185 244/123.1 |
| 2015/0203187 A1 * | 7/2015 | Johnson | B64C 3/185 244/123.7 |
| 2016/0075425 A1 * | 3/2016 | Fong | B64C 23/065 244/199.4 |
| 2016/0075426 A1 * | 3/2016 | Fong | B64C 23/065 244/199.4 |
| 2016/0075427 A1 * | 3/2016 | Fong | B64C 23/065 244/199.4 |
| 2016/0075429 A1 | 3/2016 | Fong et al. | |
| 2016/0136397 A1 | 5/2016 | Konstantino et al. | |

FOREIGN PATENT DOCUMENTS

| | | |
|---|---|---|
| CN | 101772452 A | 7/2010 |
| CN | 101795937 A | 8/2010 |
| CN | 102501965 A | 6/2012 |
| CN | 102712144 A | 10/2012 |
| DE | 102009058487 A1 | 6/2011 |
| EP | 0058783 A1 | 9/1982 |
| EP | 2206597 A2 | 7/2010 |
| GB | 2040871 A | 9/1980 |
| GB | 2164618 A | 3/1986 |
| GB | 2466793 A | 7/2010 |
| GB | 2475523 A | 5/2011 |
| WO | 9517997 A2 | 7/1995 |
| WO | WO 2011061513 A2 * | 5/2011 ............ B29C 33/68 |
| WO | 2012143363 A2 | 10/2012 |

OTHER PUBLICATIONS

Examination and Search Report dated Oct. 10, 2016 Chinese Application No. 201480021838.7.
Search Report dated Oct. 4, 2013 in Great Britain Application No. GB1307066.9.
Search Report dated Feb. 6, 2014 in Great Britain Application No. GB1307066.9.
Search Report dated Feb. 9, 2014 in Great Britain Application No. GB1307066.9.
Search Report dated Feb. 11, 2014 in Great Britain Application No. GB1307066.9.
ISR and WO dated Sep. 11, 2014 in PCT/GB2014/051227.
ISR and WO dated Sep. 11, 2014 in PCT/GB2014/051228.
ISR and WO dated Sep. 18, 2014 in PCT/GB2014/051226.
ISR and WO dated Jul. 10, 2014 in PCT/GB2014/051229.
J. S. Tate, A. D. Kelkar, and V. A. Kelkar, "Failure analysis of biaxial braided composites under fatigue loading", The 15th European Conference of Fracture (ECF), Stockholm, Sweden, Aug. 11-13, 2004.
White, Mark L., "Development of Manufacturing Technology for Fabrication of a Composite Helicopter Main Rotor Spar by Tubular Braiding", vol. 1618. Kaman Aerospace Corp Bloomfield CT, 1981.

(56) References Cited

OTHER PUBLICATIONS

China Examination and Search Report dated Aug. 26, 2016 CN Application No. 201480021848.0.
China Examination and Search Report dated Aug. 28, 2016 CN Application No. 201480022309.9.
Exam Report, EP Application No. 14 718 720.7, dated Nov. 27, 2017. 6pp.
Exam Report, EP Application No. 14 719 820.4, dated Nov. 29, 2017. 6pp.
Rajiv A. Naik, "Analysis of Woven and Braided Fabric Reinforced Composites", NASA Contractor Report 194930. Jun. 1994. 48pp. Hampton, Virginia.

* cited by examiner

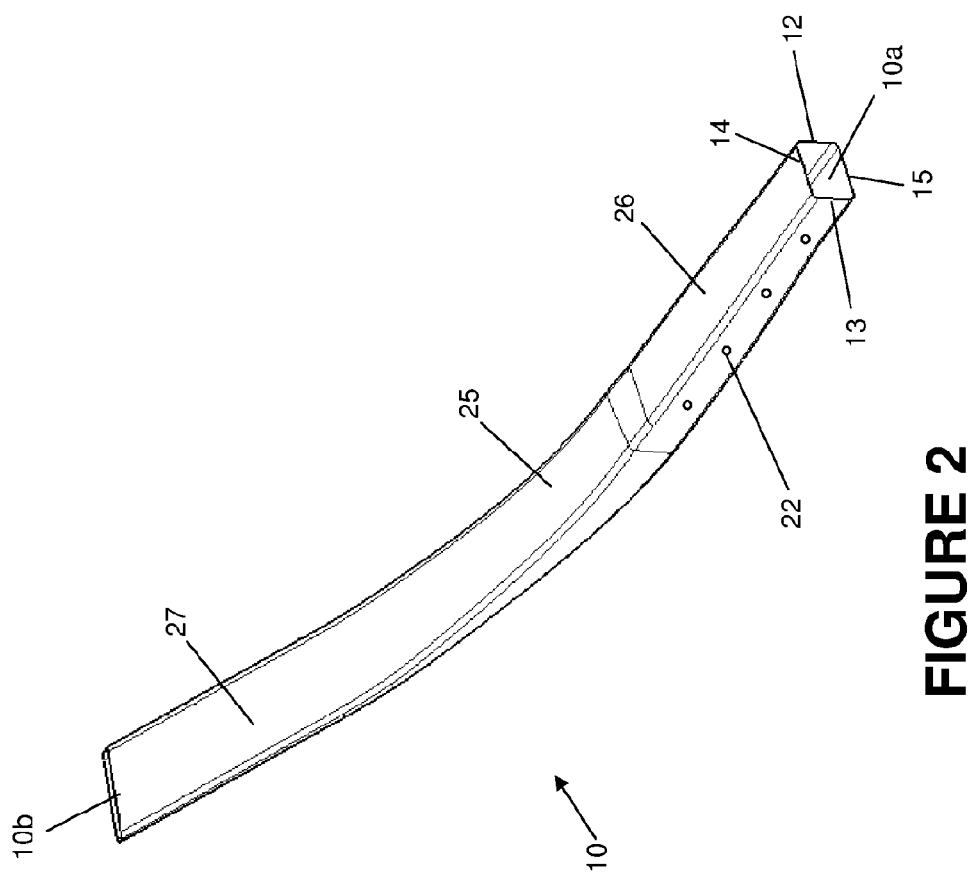

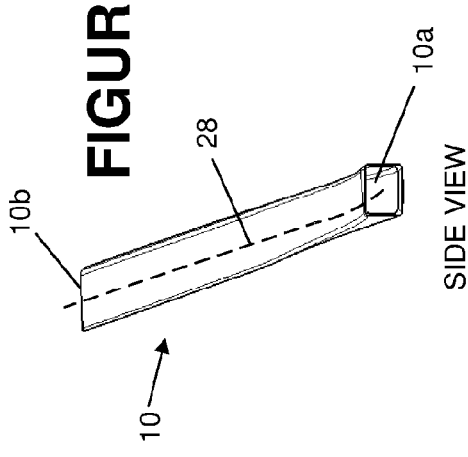
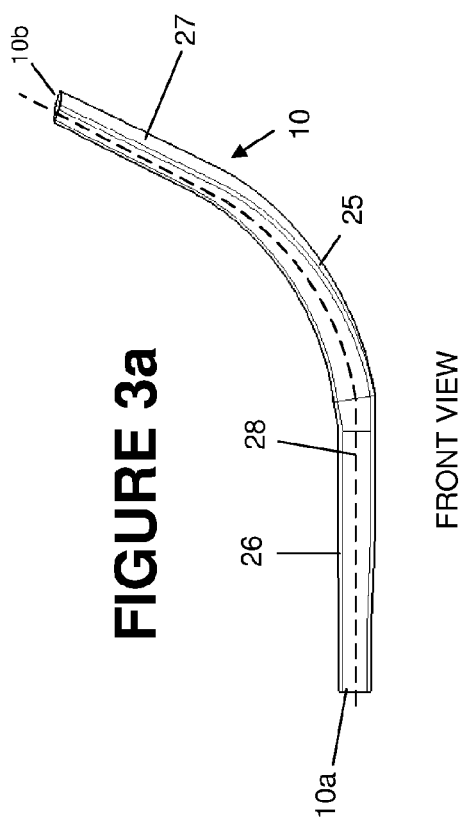
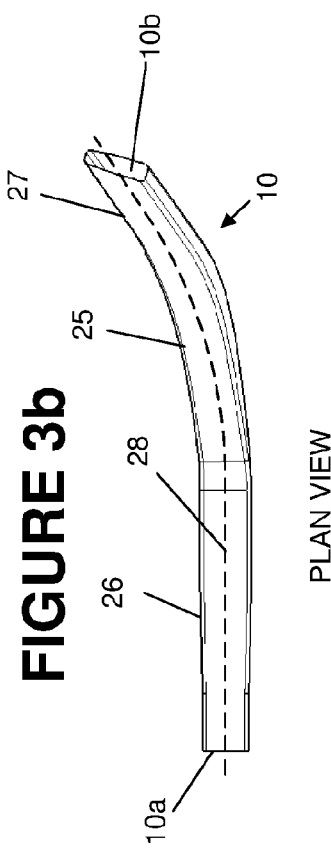

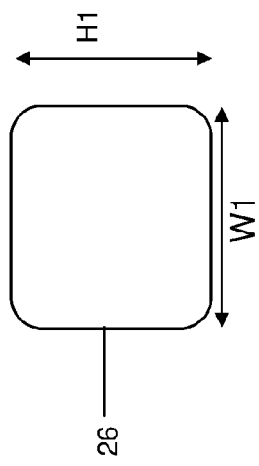
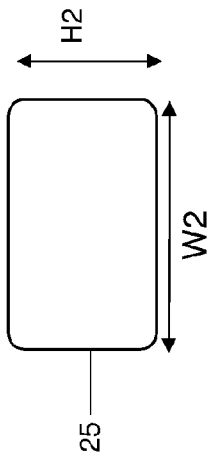
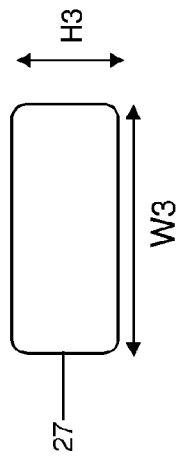
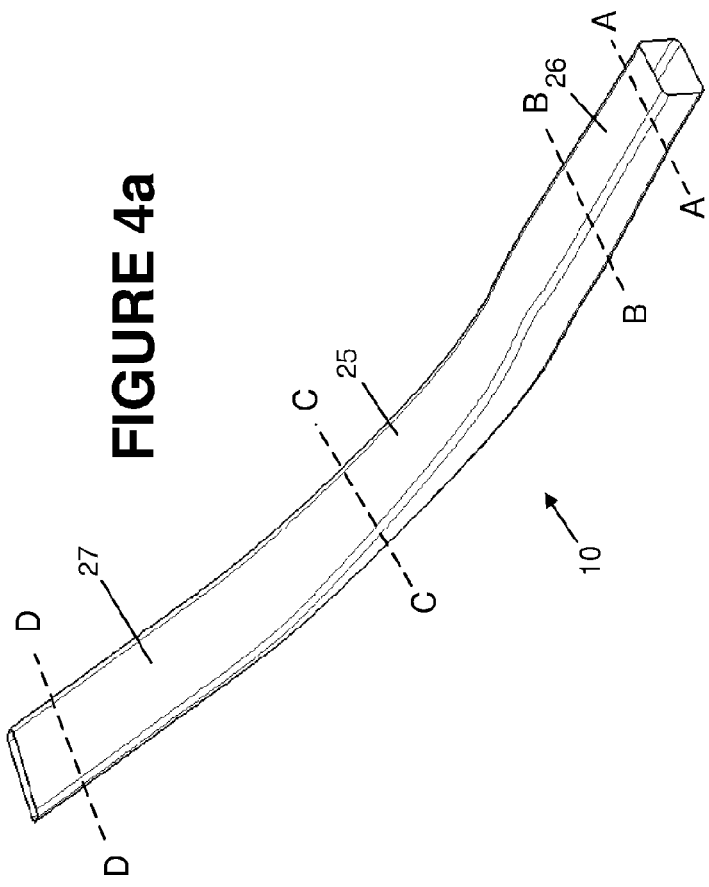

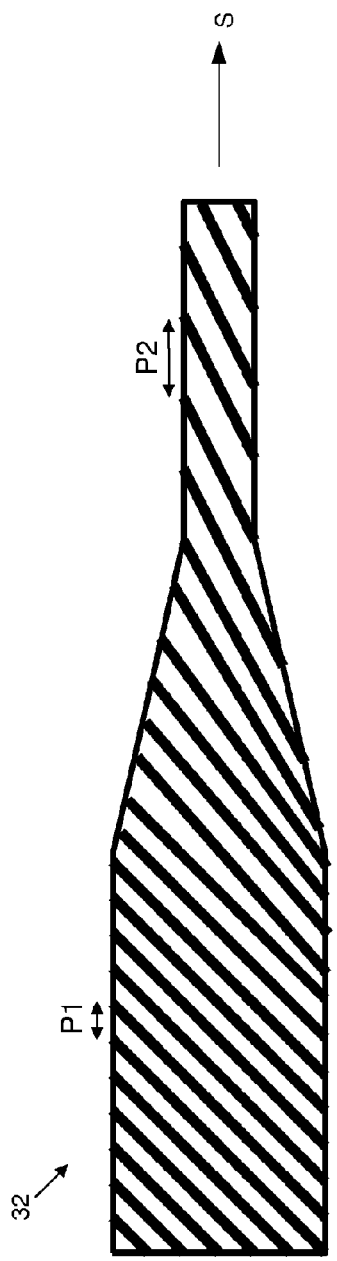
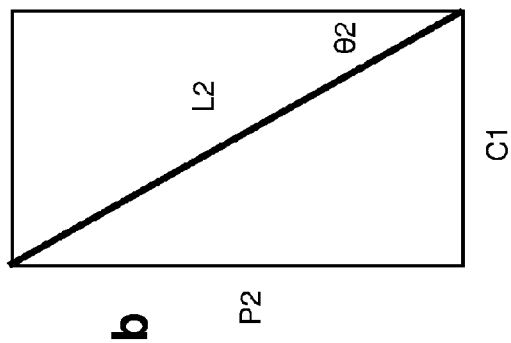
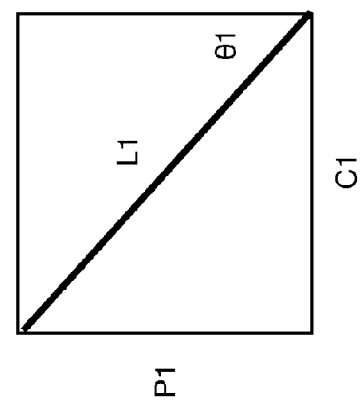
FIGURE 7
FIGURE 8a
FIGURE 8b

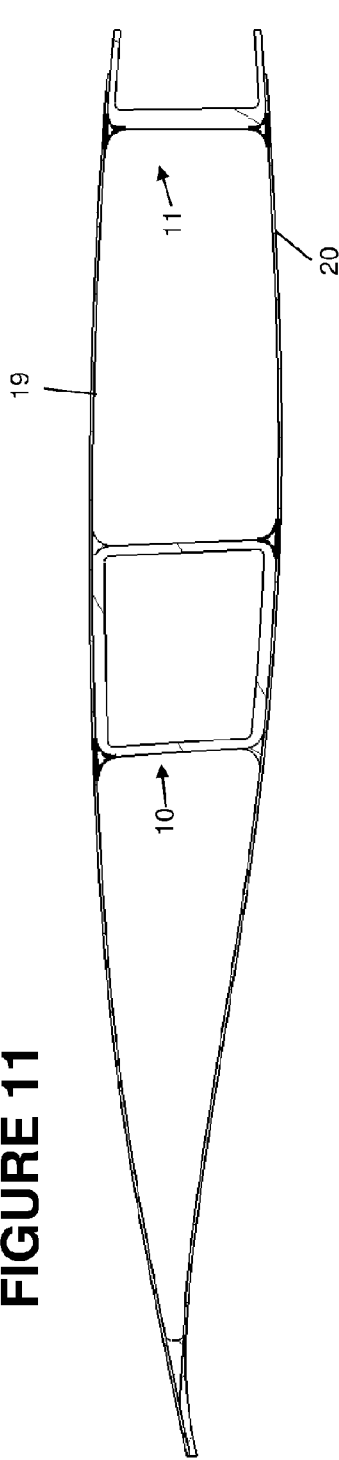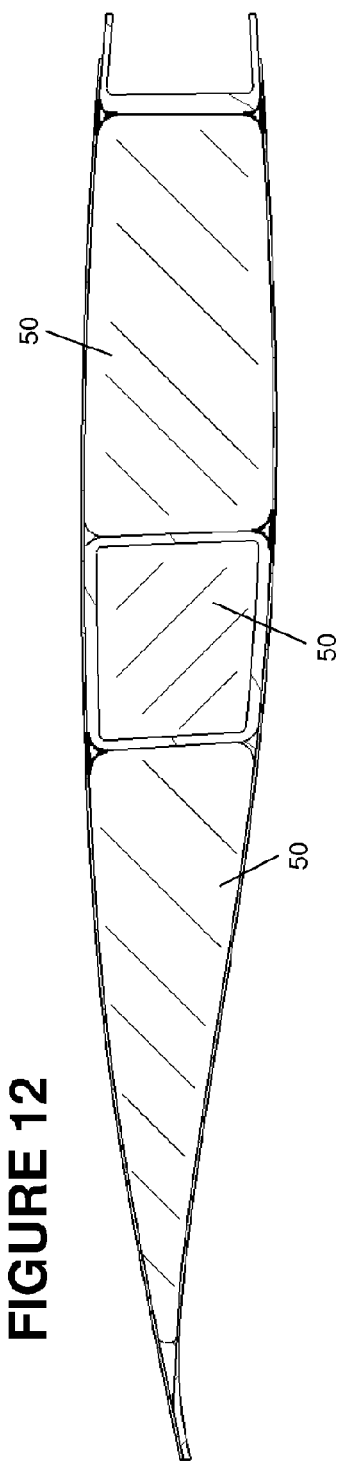

BRAIDED COMPOSITE SPAR

RELATED APPLICATIONS

The present application is a National Phase of International Application Number PCT/GB2014/051228, filed Apr. 17, 2014, which claims priority from Great Britain Application Number 1307066.9, filed Apr. 18, 2013, the disclosure of which is hereby incorporated by reference herein in its entirety.

FIELD OF THE INVENTION

The present invention relates to a winglet, a braided composite spar for a winglet or other structure, and a preform for such a braided composite spar.

BACKGROUND OF THE INVENTION

In the large civil aircraft aviation industry the growth in size of wing tip devices over the years as a result of drive to increase wing efficiency through reduction of drag has lead to technical challenges related to the load transfer and efficient joint technology between the wing tip device and wing. Existing large civil aircraft wing tip attachment methods, such as that described in U.S. Pat. No. 7,975,965 B2, are generally made up of a 'back-to-back' rib solution where the loads are transferred across a joint utilising the chord depth of the local wing section.

An innovative solution created to decouple the limitations of load transfer through local chord depth is described in US 2012/0112005 A1. This idea proposes a joint concept that utilises a 'main beam' structure to carry the primary wing tip loads and transfer these into the wing via an increased moment arm.

However, the wing tip device tends to be over-engineered, particularly at the attachment point, in order to guarantee the mechanical properties required for the use of such fastening means because current manufacturing methodologies make it difficult to adequately tailor the structural behaviour of the composite beam.

It remains difficult to manufacture and construct using composite materials the complex spar geometry that enables a winglet to be attached to a main wing element. The use of conventional methods such as an assembly of multiple parts to form the spar are difficult due to the lack of access in the geometry available for tooling and assembly, and also inefficient as a result of requiring an increased number of parts, thus increasing cost and weight of the final component, or resulting in a compromise of the structural design to meet the manufacturing constraints.

A known braiding process for forming a complex shaped fibre preform is described in U.S. Pat. No. 8,061,253. The method comprises braiding a plurality of fibres over a non-cylindrical mandrel to form a variable thickness shaped fibre preform. The preform is subsequently flattened and cut to form the spar component. The mandrel is moved at a constant speed during the braiding process.

As noted in J. S. Tate, A. D. Kelkar, and V. A. Kelkar, "Failure analysis of biaxial braided composites under fatigue loading", The 15$^{th}$ European Conference of Fracture (ECF), Stockholm, Sweden, Aug. 11-13, 2004, when a biaxial braid tube is used for a component of varying cross-section, the braid angle, thickness and areal weight (yield) vary from point to point.

White, Mark L. *Development of Manufacturing Technology for Fabrication of a Composite Helicopter Main Rotor Spar by Tubular Braiding*. Vol. 1618. KAMAN AEROSPACE CORP BLOOMFIELD Conn., 1981 describes a braided spar for a helicopter main rotor. Each braided layer is designed to be applied at a constant pitch (i.e., mandrel advance per revolution of the braider carriers) allowing the fibre orientation angle to decrease and the layer thickness to increase as circumference decreases along the tapered spar.

SUMMARY OF THE INVENTION

A first aspect of the invention provides a braided composite spar or preform for a braided composite spar, comprising a plurality of tubular plies of braided fibres, wherein the spar or preform extends lengthwise from a root to a tip, and the spar or preform has a tapered portion in which each ply has a height which reduces and a width which increases as it extends toward the tip.

In a conventional braided spar of varying circumference, the fibre angle, thickness and areal weight vary as the circumference varies. The special shape of the braided spar or preform of the first aspect of the invention has a particular benefit since it enables the height of the spar or preform to be reduced without a large accompanying change in circumference.

Optionally the spar or preform comprises a plurality of tubular plies of braided fibres, each ply comprises a first set of fibres which wind in a clockwise direction in a first series of turns with a pitch between each adjacent pair of turns, and a second set of fibres which wind in an anti-clockwise direction in a second series of turns with a pitch between each adjacent pair of turns, the first and second sets of fibres in each ply being intertwined to form a braided structure; wherein the spar or preform extends lengthwise from a root to a tip, the spar or preform has a tapered portion which tapers inwardly towards the tip, each ply has a circumference in the tapered portion which reduces as it tapers inwardly, and for at least one of the plies the pitches of the first and second sets of fibres increase as the ply tapers inwardly in the tapered portion.

A second aspect of the invention provides a method of manufacturing a preform for a composite spar according to the first aspect of the invention, the method comprising forming the preform on a mandrel, wherein the mandrel has a tapered portion in which it has a height which reduces and a width which increases as it extends toward the tip.

Optionally the method comprises forming a plurality of tubular plies of braided fibres, each ply being formed by feeding a first set of fibres from a first set of bobbins onto a mandrel, wherein the mandrel has a tapered portion which tapers inwardly so as to reduce its outer circumference as it extends in an outboard direction along a length of the mandrel; rotating the mandrel and/or the first set of bobbins to generate a clockwise relative rotation between the first set of bobbins and the mandrel at a rotation rate ω1; feeding a second set of fibres from a second set of bobbins onto the mandrel; rotating the mandrel and/or the second set of bobbins to generate an anti-clockwise relative rotation between the second set of bobbins and the mandrel at a rotation rate ω2; traversing the bobbins and/or the mandrel to generate a relative motion between them at a speed S so that the first and second sets of fibres are wound onto the mandrel and become intertwined to form a braided structure; wherein the method further comprises for at least one of the braided plies varying a ratio S/ω1 (typically continuously) between the speed S and the rotation rate ω1 as the first set of fibres are wound onto the tapered portion of the mandrel so that the ratio S/ω1 increases as the mandrel tapers inwardly, and also varying a ratio $S/\omega_2$ (typically continuously) between the speed S and the rotation rate $\omega_2$ as the second set of fibres are wound onto the tapered portion of the mandrel so that the ratio $S/\omega_2$ increases as the mandrel tapers inwardly. This enables fibre angles to be varied within the spar or preform without a step change in the plies and without stopping the formation process.

The method of the second aspect of the invention produces a braided preform for a composite spar. After winding onto the mandrel the preform may be impregnated with a matrix such as an epoxy resin (to produce a "wet" preform) or it may be a "dry" preform which has not yet been impregnated with a matrix.

There are two benefits in increasing the fibre pitch (by increasing the ratios $S/\omega_1$ and $S/\omega_2$) in the direction of inward taper and reducing circumference. Firstly it causes a reduction in fibre angle which goes beyond that which would be created by winding the fibres onto the mandrel at a constant speed and pitch (as in the prior art). This enables the structural properties of the spar or preform to be tailored as required—for instance providing higher bending stiffness at the tip than at the root. For example the first and second sets of fibres may have a fibre angle which changes by more than 10° or 15° in the tapered portion. At the same time it counteracts the tendency of the tapering mandrel to gradually increase the areal weight and thickness of each ply. Thus each ply may have an areal weight or thickness which does not change in the tapered portion, or at least does not change by more than 10% or 5% within the tapered portion. Typically each ply also has an areal weight or thickness which does not change by more than 10% or 5% over the entire length of the spar or preform. Providing a relatively constant areal weight and/or thickness (despite the tapered shape of the spar or preform) enables the spar or preform to be modelled and analysed more easily by computer-aided design.

The tapered portion of the spar or preform may extend over its full length from its root to its tip. Alternatively the spar or preform has an inboard portion (which may be non-tapered) between the tapered portion and the root. One or more fastener holes may be provided in the inboard portion. The spar or preform may have an outboard portion (which may be non-tapered) between the tapered portion and the tip.

Optionally the spar or preform has a centre line which extends lengthwise from a root to a tip, and at least part of the centre line follows a curved path which does not lie in a single plane.

The first aspect of the invention provides a braided composite spar or a preform for a braided composite spar. In the case of a composite spar, the tubular plies of braided fibres are impregnated with a matrix such as an epoxy resin. In the case of a preform, the preform may be a "wet" composite preform in which the tubular plies of braided fibres are impregnated with an uncured matrix such as an epoxy resin, or it may be a "dry" preform which has not yet been impregnated with a matrix.

The braided spar or preform may be for use in the main element of an aircraft wing, a turbine blade or other structure. Alternatively the spar or preform may be for use in a winglet for attachment to a tip of a main element of an aircraft wing. In this case the spar typically comprises forward and aft webs joined by upper and lower caps, and the winglet comprises an upper skin joined to the upper cap of the spar and a lower skin joined to the lower cap of the spar. The spar may be canted (up or down) and/or swept (forward or aft) relative to the main wing element. Typically the braided spar of the winglet has an inboard portion, and an outboard portion which is canted (up or down) and/or swept (forward or aft) relative to the inboard portion. Typically the main wing element comprises a spar, and the braided spar of the winglet is attached to the spar of the main wing element. The wing may be a fixed wing (to be fixed to an aircraft fuselage) or a rotary wing (for a helicopter or other rotary wing aircraft).

Optionally the braided spar forms part of a winglet comprising a braided tubular main spar according to the invention with forward and aft main spar webs joined by upper and lower main spar caps; a front spar with a front spar web, an upper front spar cap, and a lower front spar cap; an upper skin joined to the upper main spar cap and the upper front spar cap; and a lower skin joined to the lower main spar cap and the lower front spar cap.

The winglet can be attached to the tip of the main wing element of an aircraft wing, and the spar may be canted (up or down) and/or swept (forward or aft) relative to the main wing element. Typically the braided tubular main spar of the winglet has an inboard portion, and an outboard portion which is canted (up or down) and/or swept (forward or aft) relative to the inboard portion. Typically the main wing element comprises a rear spar which is attached to the tubular main spar of the winglet (typically by one or more fasteners such as bolts which pass through the two spars); and a front spar which is attached to the front spar of the winglet (also by one or more fasteners such as bolts which pass through the two spars). The wing may be a fixed wing (fixed to an aircraft fuselage) or a rotary wing (for a helicopter or other rotary wing aircraft).

The upper and lower front spar caps may extend aft towards the main spar. However a problem with such an arrangement is that the upper and lower skins must be formed with joggles to enable a leading edge skin assembly to be attached to them. Therefore more preferably the upper front spar cap extends forwards away from the main spar and the lower front spar cap extends forwards away from the main spar. Such forwardly extending spar caps are preferred since they enable a leading edge skin to be attached directly to the spar caps without having to form joggles in the skins.

The front spar may be tubular with forward and aft front spar webs joined by the upper and lower front spar caps. Alternatively the front spar may be C-shaped with the upper and lower front spar caps terminating at forward edges.

The skins may be joined to the spars by fasteners but more preferably they are bonded to the spars by co-curing, co-bonding or secondary bonding.

A leading edge skin may be joined to the upper and lower front spar caps by fasteners, or bonded by co-curing, co-bonding or secondary bonding.

The winglet may be manufactured by co-curing the upper skin to the upper main spar cap and the upper front spar cap; and co-curing the lower skin to the lower main spar cap and the lower front spar cap.

During the co-curing process the webs and caps of the main spar may be compacted against a first tool inside the main spar. Similarly the upper skin, the lower skin, the forward main spar web, and the front spar web may be compacted against a second tool between the main spar and the front spar. Similarly the front spar web and the upper and lower front spar caps may be compacted against a third tool in front of the front spar web. The tools may be removed after the co-curing or may be left in the finished article.

A third aspect of the invention provides a mandrel for manufacturing a preform for a composite spar according to the first aspect of the invention, wherein the mandrel extends lengthwise from a root to a tip, and the mandrel has a tapered portion in which it has a height which reduces and a width which increases as it extends toward the tip.

BRIEF DESCRIPTION OF THE DRAWINGS

Embodiments of the invention will now be described with reference to the accompanying drawings, in which:

FIG. 2 is an isometric view of the main spar beam of the winglet;
FIG. 3a is a front view of the spar of FIG. 2;
FIG. 3b is a plan view of the spar of FIG. 2;
FIG. 3c is a side view of the spar of FIG. 2;
FIG. 4a is an isometric view of the spar of FIG. 2 denoting reference points for sectional views;
FIG. 4b is a sectional view of the spar of FIG. 4a at section A-A and B-B;
FIG. 4c is a sectional view of the spar of FIG. 4a at section C-C;
FIG. 4d is a sectional view of the spar of FIG. 4a at section D-D;
FIG. 7 is a schematic view of the mandrel showing the change in fibre pitch and fibre angle in one ply of a preform;
FIG. 8a shows part of the inboard portion of a ply containing a single turn;
FIG. 8b shows part of the outboard portion of a ply containing a single turn;
FIG. 11 is a sectional view of a winglet following the curing step of FIG. 10 with the inflatable tools removed;
FIG. 12 is a sectional view of a winglet cured using foam tools.

DETAILED DESCRIPTION OF EMBODIMENT(S)

Figure 1A:
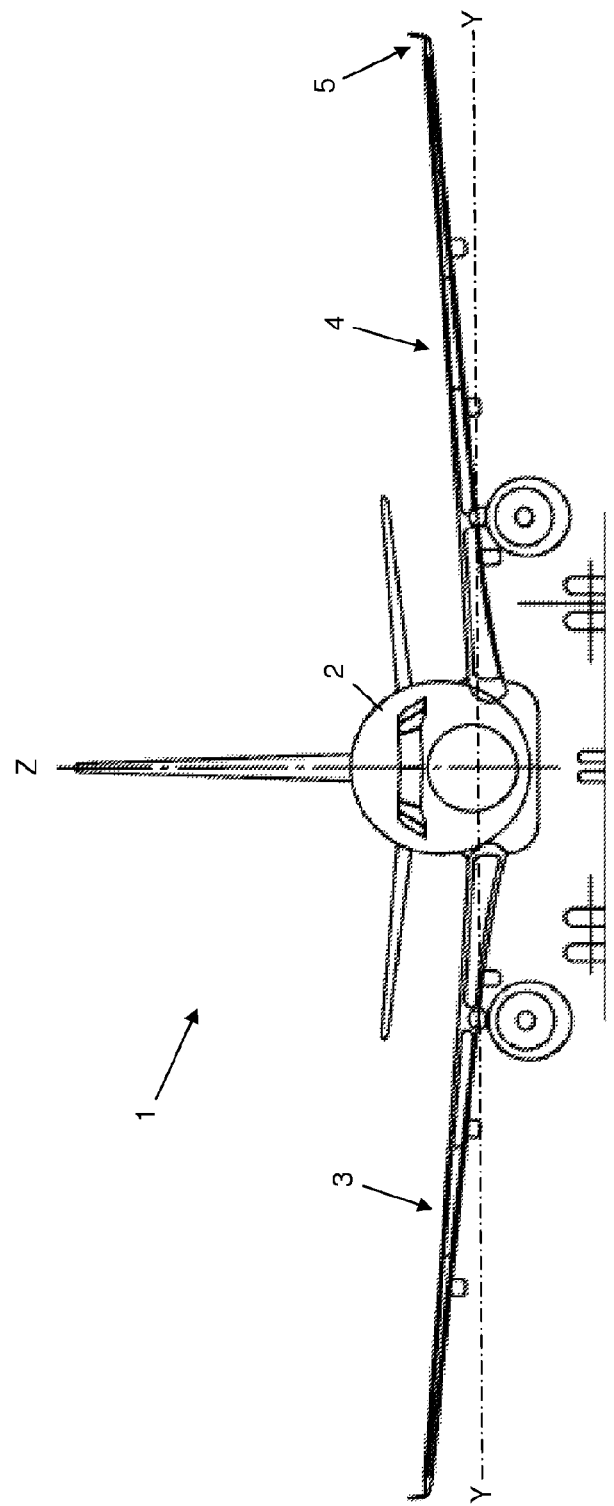
FIG. 1a is front view of an aircraft.
Figure 1B:
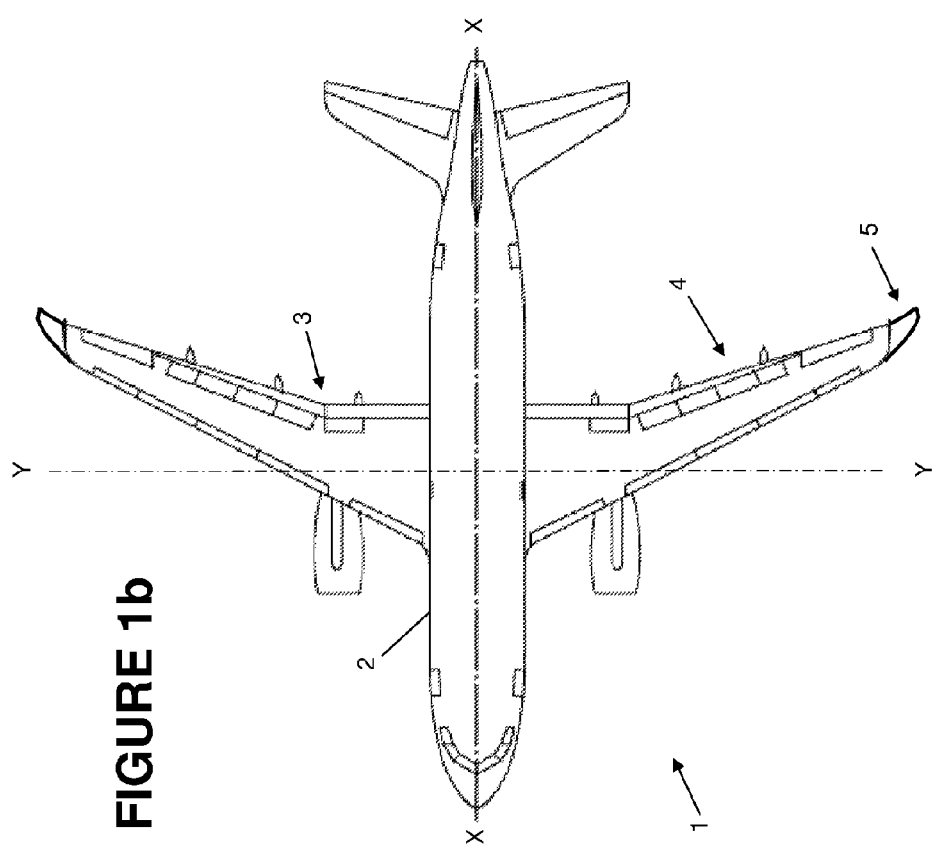
FIG. 1b is a plan view of the aircraft.
Figure 1C:
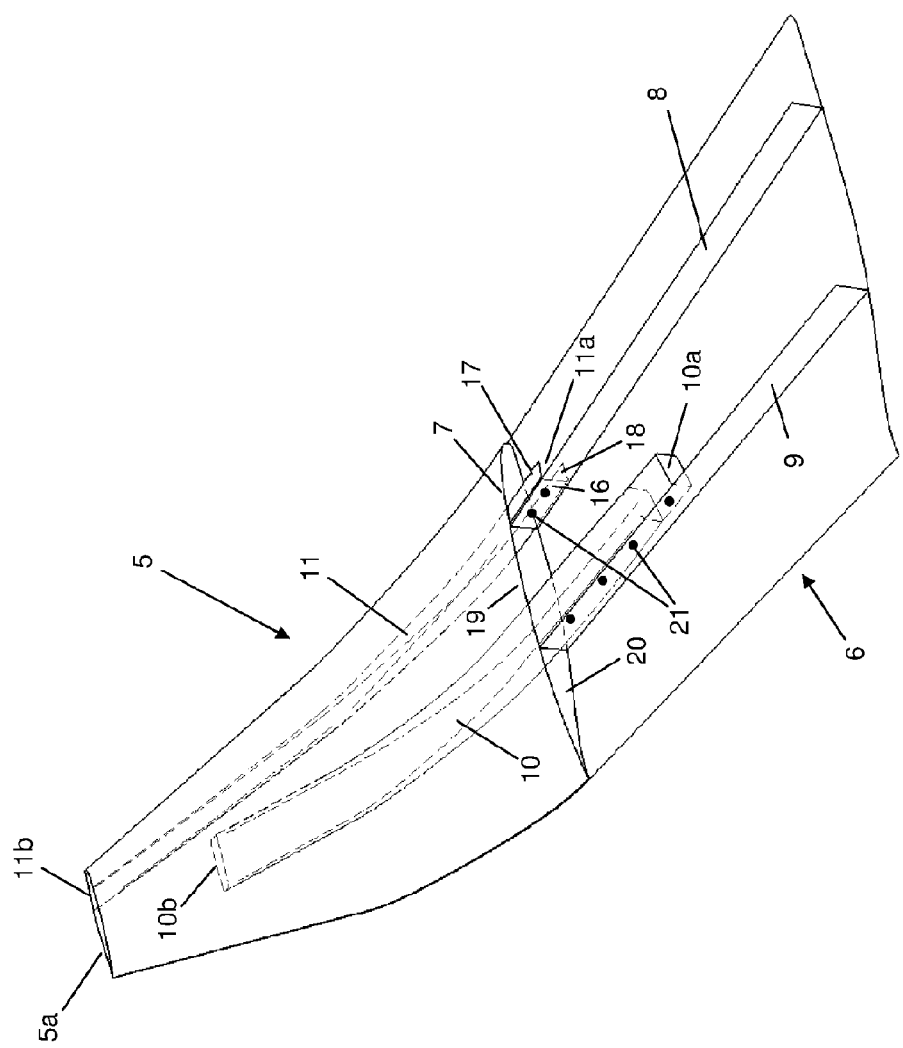
FIG. 1c shows a winglet installation at the tip of the port wing.

FIGS. 1a and 1b show an aircraft 1 with a fuselage 2 carrying a pair of wings 3,4. The aircraft has a horizontal fore/aft axis (labelled X) and a horizontal inboard/outboard axis (labelled Y) normal to the fore/aft axis. Each wing has a winglet and the winglet 5 at the tip of the port wing 4 is shown in FIG. 1c. The port wing 4 comprises a main wing element 6 with a tip 7, and a winglet 5 attached to the tip. The main wing element 6 has front and rear spars running along its full span from a root near the fuselage 2 to its tip 7. Only the webs 8,9 of these spars are shown in FIG. 1 but they also have spar caps which could point in (towards the other spar) or out. A fuel tank is housed in the main wing element 6 between the spar webs 8,9.

The winglet 5 has a main (rear) spar 10 and a front spar 11. The main spar 10 extends from a root 10a to a tip 10b which is short of a tip 5a of the winglet 5 so it does not run along the full span of the winglet. The front spar 11 extends along the full span of the winglet from a root 11a to a tip 11b. The front spar is C-shaped with a front spar web 16, a forwardly directed upper front spar cap 17, and a forwardly directed lower front spar cap 18.

As shown in FIG. 2 the main spar 10 of the winglet is tubular (that is, forming a closed cross-sectional shape) with forward and aft main spar webs 12,13 joined by upper and lower main spar caps 14,15. As shown in FIG. 1c an upper skin 19 of the winglet is bonded to the upper main spar cap 14 and the upper front spar cap 17, and a lower skin 20 of the winglet is bonded to the lower main spar cap 15 and the lower front spar cap 18.

The winglet spars 10,11 have inboard portions which overlap with, and are attached to, the webs 8,9 of the spars in the main wing element 6. The aft web 13 of the winglet main spar 10 is attached to the web 9 by fasteners 21 such as bolts or rivets which pass through holes formed in the two webs. Similarly the web 16 of the winglet front spar 11 is attached to the web 8, also by fasteners 21 such as bolts or rivets which pass through holes drilled in the two webs.

The winglet 6 has three spar webs 12,13,16 (unlike the winglet described in US 2012/0112005 A1 which has only two) but no transverse webs running fore and aft and connecting the upper and lower skins (unlike the winglet described in US 2012/0112005 A1 which has a number of such transverse ribs). The closed tubular structure of the main spar 10 enables the winglet to handle bending loads more efficiently and means that transverse ribs are not required. Whilst the main spar 10 handles bending loads the front spar 11 stops the winglet from twisting unduly.

The complex geometry of the main spar 10 is shown in detail in FIGS. 2-4. The spar 10 extends lengthwise from a root 10a to a tip 10b. It has a tapered central portion 25 which tapers inwardly towards the tip 10b, a non-tapered inboard portion 26 between the tapered portion and the root, and a non-tapered outboard portion 27 between the tapered portion and the tip. The aft web of the inboard portion 26 is drilled with fastener holes 22 for receiving the fasteners 21.

The spar has a centre line 28 shown in dashed lines in FIGS. 3a-c which extends lengthwise from the root to the tip passing through the geometric centre of the spar at each station along its length. The centre line 28 is straight in the inboard and outboard portions of the spar, but follows a curved path in the tapered central portion 25. This curved path is doubly curved so it does not lie in a single plane and appears curved from the two orthogonal viewing directions of FIGS. 3a and 3b.

FIG. 3a is a front view of the main spar 10, viewed from the front in a direction parallel to the fore-aft (X) axis of the aircraft. The cant angle of the various parts can be seen in FIGS. 1a and 3a. It can be seen from FIG. 1a that the cant or anhedral angle of the main wing element (including its spars) is quite small (of the order of 10°) and the cant or anhedral angle of the centre line 28 of the main spar 10 of the winglet increases continuously along the curved path by about 50° as shown in FIG. 3a.

FIG. 3b is a plan view of the winglet, viewed vertically from above (like FIG. 1b) parallel to a vertical Z-axis shown in FIG. 1a. The viewing direction of FIG. 3b is orthogonal to the viewing direction of FIG. 3a. The sweep angle of the various parts can be seen in FIGS. 1a and 3a. It can be seen from FIG. 1a that the sweep angle of the main wing element (including its spars) is quite small whereas the sweep angle of the centre line 28 of the main spar 10 of the winglet increases continuously along the curved path by about 15° as shown by FIG. 3b.

As shown in FIGS. 4a-d the tapered portion 25 of the winglet main spar 10 has a circumference and height which reduce continuously along its length. Thus the circumference of the spar at station B-B in the inboard portion 26 (FIG. 4b) is greater than at station C-C in the tapered portion 25 (FIG. 4c) which in turn is greater than at station D-D in the outboard portion 27 (FIG. 4d). Similarly the height of the spar (and of the spar webs) at station B-B (height H1) is greater than at station C-C (height H2) which in turn is greater than at station D-D (height H3). On the other hand the fore-and-aft width of the tapered portion of the spar (and the width of the spar caps) increases as it extends toward the tip of the spar. Thus the width of the spar at station B-B (width W1) is less than at station C-C (width W2) which in turn is less than at station D-D (width W3).

The main spar 10 of the winglet comprises a plurality of tubular plies of braided fibres. A braided dry fibre preform for the main spar 10 is produced by the braiding apparatus shown in FIGS. 5 and 6. The apparatus comprises a bobbin braiding ring 30, a braiding ring 31 and a mandrel 32. Note that the mandrel is shown in schematic form only in FIG. 5 and in practice will have a complex contoured shape as required to form the inner mould line of the spar 10.

Figure 6:
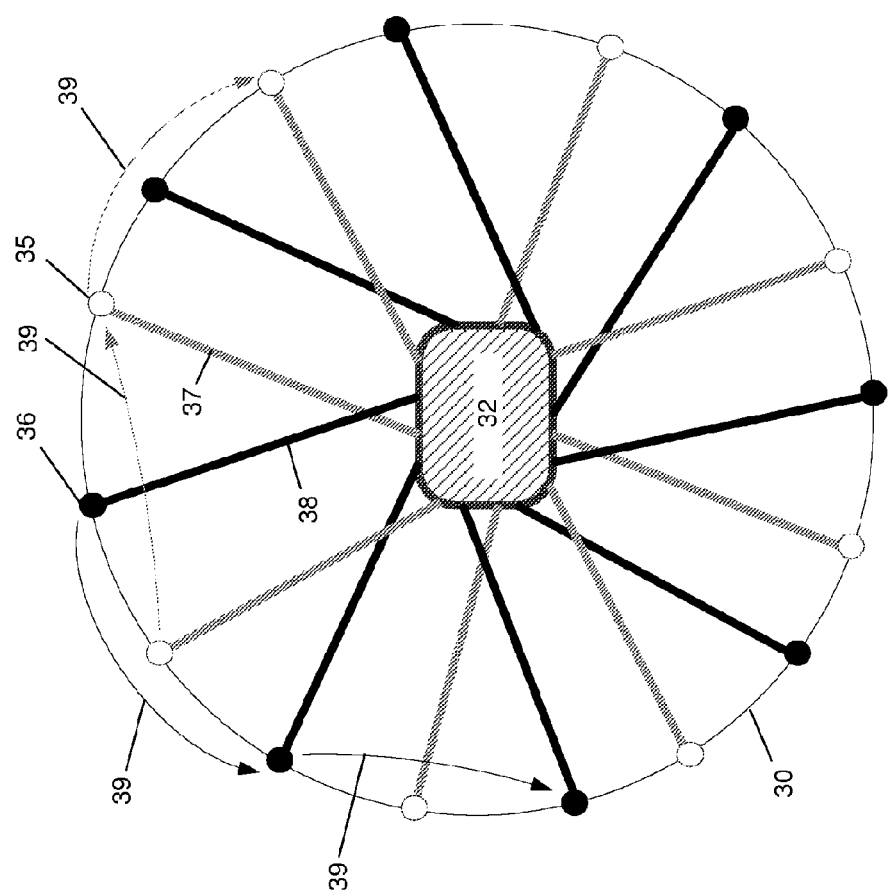
FIG. 6 is an end view of the bobbin braiding ring.

The bobbin braiding ring 30 has a first set of bobbins 35 shown by white circles in FIG. 6, and a second set of bobbins 36 shown by black circles. Each bobbin carries fibre tows which can be unwound from the bobbin through the braiding ring 31 onto a braid formation point on the mandrel 32. Thus as shown in FIG. 6 the first set of bobbins 35 feed a first set of tows 37 onto the mandrel and the second set of bobbins 36 feed a second set of tows 38 onto the mandrel. The first set of bobbins are rotated clockwise around a winding axis of the bobbin braiding ring at a rotation rate ω1 revolutions per second, and similarly the second set of bobbins are rotated anti-clockwise around the same winding axis at a rotation rate ω2 revolutions per second (which is normally the same as ω1). As they rotate around the winding axis the bobbins also follow an S-shaped motion 39 so that they weave in and out of the other bobbins.

Figure 5:
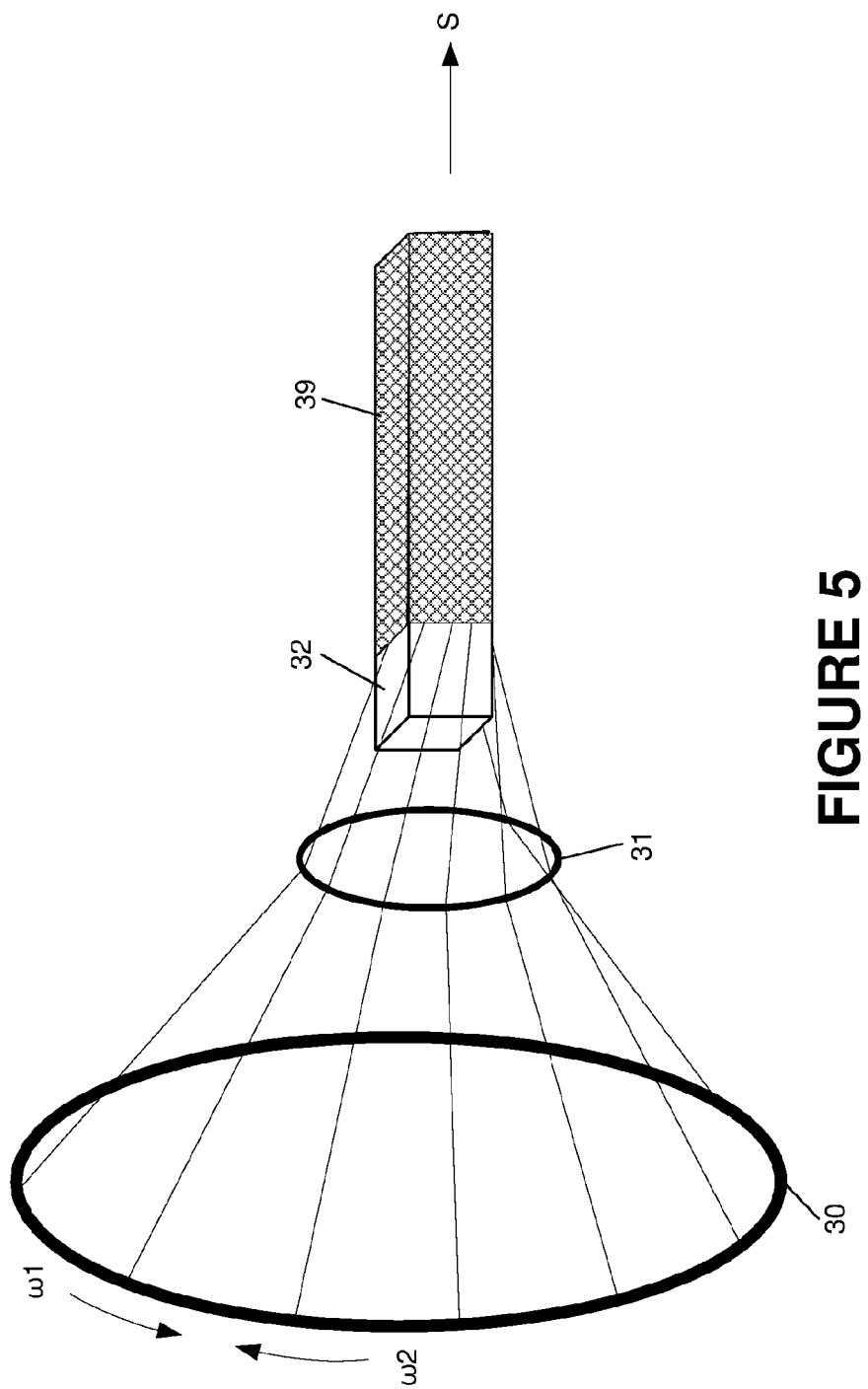
FIG. 5 is a schematic diagram of a braiding apparatus.

Meanwhile the mandrel is traversed in a straight line at a speed S along the winding axis so that the first and second sets of tows 37,38 are wound onto the mandrel 32 and become intertwined to form a ply 39 with a braided structure shown in FIG. 5. The process is then repeated (with the mandrel moving to and fro in opposite directions) to produce a preform with a plurality of tubular braided plies formed one on top of each other.

FIG. 7 is a schematic side view of the mandrel 32 and the first set of tows of a single ply formed on the mandrel. As with FIG. 5 the shape of the mandrel 32 is schematic and has been simplified relative to the spar of FIG. 1. The first set of tows is wound in a clockwise direction in a series of turns with a pitch P1, P2 between each adjacent pair of turns. Each tow has a fibre angle θ1, θ2 relative to the winding axis.

As the tow is wound onto the mandrel from left to right in the view of FIG. 7 the pitch increases and the fibre angle decreases automatically due to the reducing mandrel circumference in the tapered portion. The traversal speed S of the mandrel is continuously varied from S1 to S2 as the tow is wound onto the tapered portion of the mandrel. The pitch and fibre angle are both related to the ratio S/ω1 as well as the circumference of the mandrel, so this change of speed S causes the pitch to increase and the fibre angle to decrease to a greater degree than if S/ω1 remained constant. If the tow is wound onto the mandrel from left to right in the view of FIG. 7 (in the direction of decreasing circumference) then the ratio is increased with time during the winding, and if the tow is wound onto the mandrel from right to left in the view of FIG. 7 (in the direction of increasing circumference) then the ratio is decreased with time during the winding.

The pitch of the tow continuously varies from P1 in the inboard portion to P2 in the outboard portion, and similarly the fibre angle continuously varies from θ1 in the inboard portion to θ2 in the outboard portion. In one example θ1 is +/−45° and θ2 is +/−25° so the fibre angle changes by 20° in the tapered portion.

The braided ply has a thickness and areal weight both of which are related to the pitch and angle of the fibres. The relationship between these parameters is schematically illustrated in FIGS. 8a and 8b. FIG. 8a shows part of the inboard portion of a ply which has been cut and unfolded to form a flat rectangular panel with a circumference C1 and length P1. This panel contains a single turn of a tow of fibres with a length L1 and a fibre angle θ1 of about 45°. The areal weight and thickness of the panel are both proportional to $L1/(P1*C1)$. FIG. 8b shows part of the outboard portion of a ply which has been cut and unfolded to lie flat to form a flat rectangular panel with a circumference C2 and length P2 (where P1<P2 and C1>C2). This panel contains a single turn of a tow of fibres with a length L2 and a fibre angle θ2 of about 25°. The areal weight and thickness of the panel are proportional to $L2/(P2*C2)$. In order to achieve constant areal weight and thickness for each ply, the mandrel feed speed S is controlled during winding so that $L1/(P1*C1)=L2/(P2*C2)$. The mandrel feed speed S is inversely proportional to the circumference C.

Thus a continuous fibre angle variation is achieved through a gradual steering of the fibres in the desired direction by variations in mandrel geometry and mandrel feed speed. The mandrel feed speed is controlled to produce a ply having constant areal weight and thickness along the length of the preform. The fibre angle decreases gradually from +/−45° at the inboard portion 26 to +/−25° at the outboard portion 27. As a result the outboard portion has greater bending stiffness than the inboard portion—bending stiffness being more important at the tip of the spar than at the root of the spar. Conversely the inboard portion has greater torsional stiffness and resistance to cracking around the fastener holes—these properties being more important at the root than at the tip because there are no fasteners at the tip.

The preform described above is formed with only two set of fibres in each ply (in other words it is formed by biaxial braiding). However axial fibres extending lengthwise along the preform may be introduced to form a triaxial braid.

Figure 9:
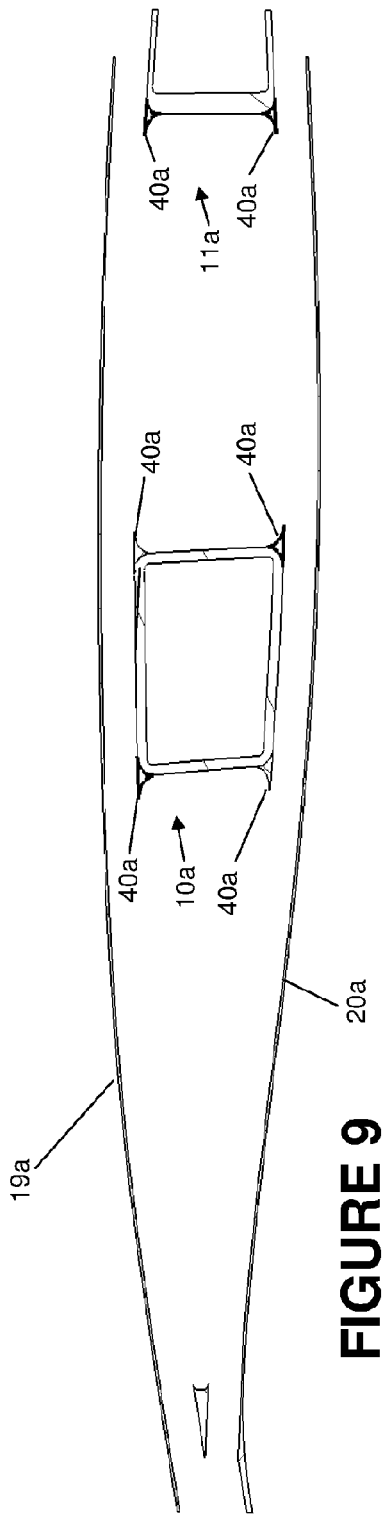
FIG. 9 is a sectional view showing an assembly step of a monolithic construction method.
Figure 10:
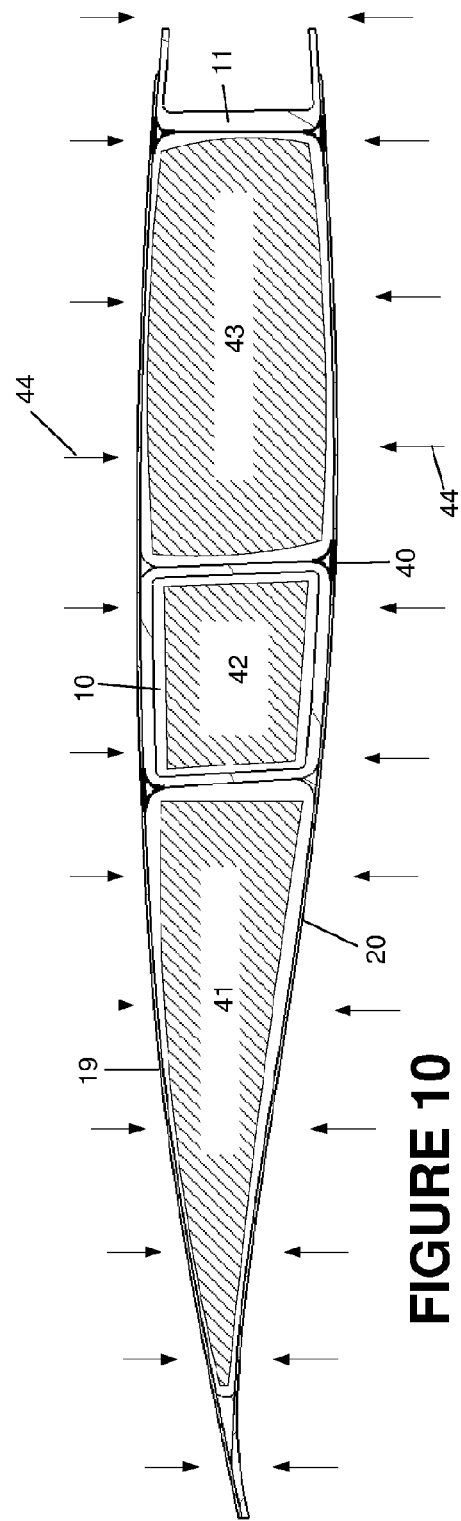
FIG. 10 is a sectional view showing a curing and infusion step of a monolithic construction method.

FIGS. 9-11 show a method of manufacturing the winglet 5. In a first step shown in FIG. 9 upper and lower skin preforms 19a, 20a are assembled with spar preforms 10a, 11a and gusset preforms 40a. The preforms 19a, 20a, 10a, 11a, 40a are made of dry fibres with no matrix. The tubular spar preform 10a is formed using the apparatus and process described above in relation to FIGS. 5 and 6. In the next step shown in FIG. 10, inflatable tools 41-43 are inserted as shown, the structure is placed in a mould cavity between upper and lower mould tools (not shown) and liquid epoxy resin is injected into the mould cavity to infuse and impregnate the dry fibre preforms to produce composite spars 10,11, skins 19,20 and gussets 40. Pressure 44 is then applied from the exterior of the winglet by the mould tools, the inflatable tools 41-43 are inflated to apply pressure from the inside of the winglet, and the assembly is heated as the pressure 44 is applied to cure the resin in the various composite parts as well as co-curing the skins to the spar caps and the gussets.

During the curing process shown in FIG. 10 the webs and caps of the main spar 10 are compacted against an inflated tool 42 inside the main spar 10. Similarly the upper skin, the lower skin, the forward main spar web and the front spar web are compacted against an inflated tool 43 between the main spar 10 and the front spar. Similarly the aft parts of the skins are compacted against an inflated tool 41 aft of the main spar 10. After cure, the inflatable tools 41-43 are deflated and removed from the root of the winglet, leaving the cured structure shown in FIG. 11.

Alternatively the inflatable and removable tools shown in FIG. 10 can be replaced by foam curing tools 50 shown in FIG. 12. These foam tools can be left inside the finished article instead of being removed.

Figure 13B:
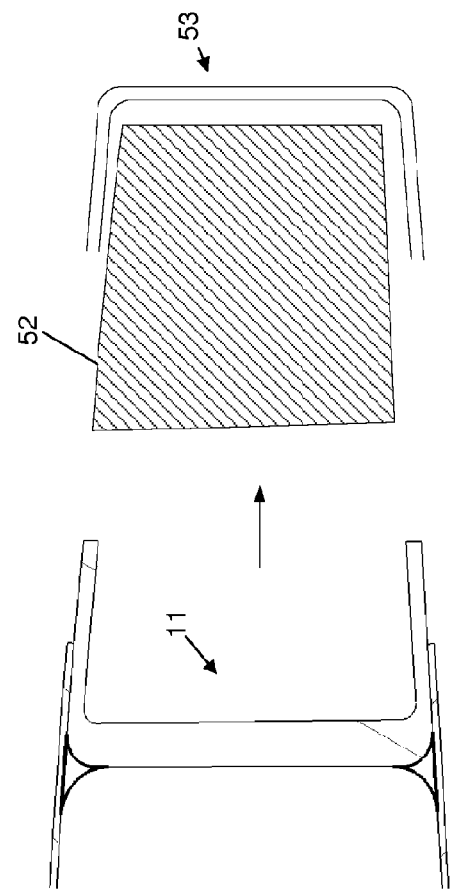
FIG. 13b is a sectional view showing a second step in the manufacture of the leading edge of the winglet.
Figure 13A:
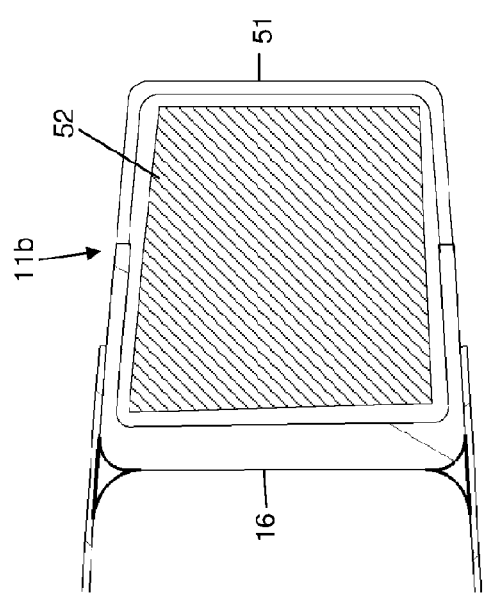
FIG. 13a is a sectional view showing a first step in the manufacture of the leading edge of the winglet.

FIGS. 13a and 13b show two steps in the manufacture of the front spar 11. First a tubular front spar preform 11b is formed (by braiding or any other method such as tape laying or fibre placement). The tubular front spar preform 11b has forward and aft webs 16,51 joined by upper and lower front spar caps. The tubular front spar preform 11b is fitted with an inflatable tool 52 and then infused and cured along with the other parts of the winglet in the process shown in FIG. 10 or 12. During this curing process both webs 16,51 and both caps of the tubular front spar are compacted against the inflated tool 52. After cure is complete, the front half 53 of the tubular front spar is cut away as shown in FIG. 13b and removed along with the deflated tool 52, leaving the C-section front spar 11 as shown.

Figure 14:
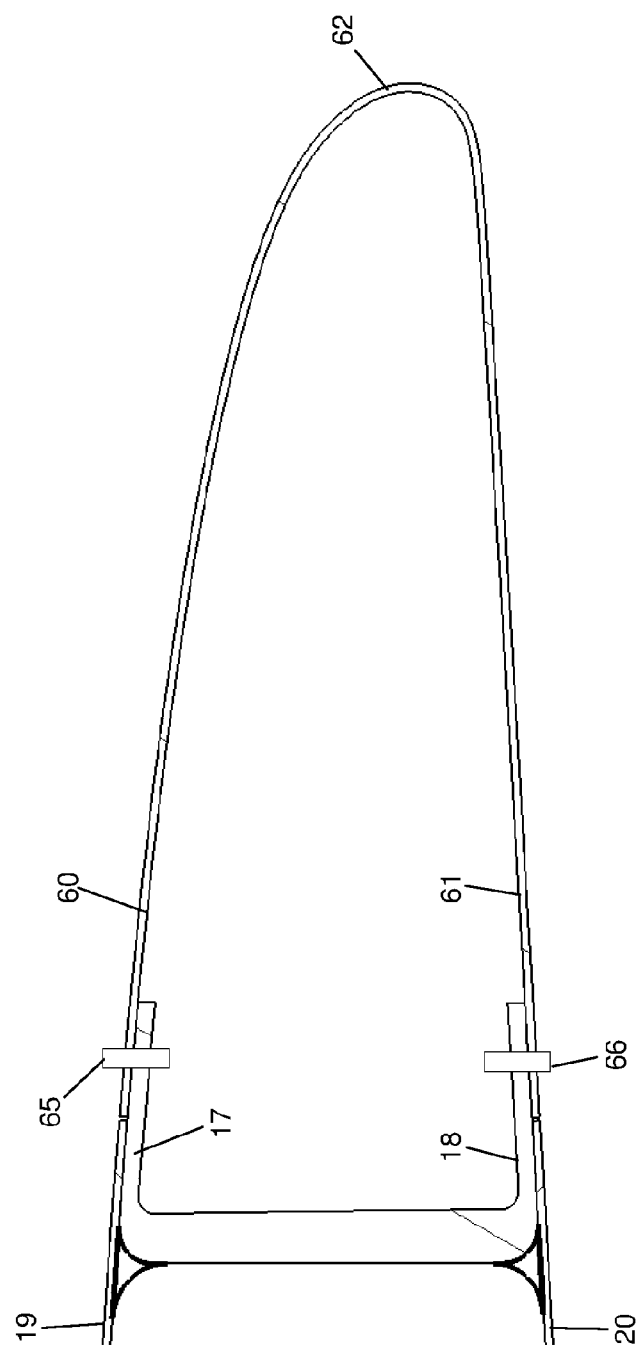
FIG. 14 is a sectional view of the leading edge of the winglet of FIG. 13b with a leading edge skin attached by fasteners.

Finally a leading edge skin is attached to the upper and lower spar caps by fasteners as shown in FIG. 14. The leading edge skin comprises an upper leading edge skin panel 60 attached at its aft edge to the upper spar cap 17 by fasteners 65, a lower leading edge skin panel 61 attached at its aft edge to the lower spar cap 18 by fasteners 66; and a curved D-nose skin panel 62 connecting the upper and lower skin panels. The skin panels 60-62 may be separate parts or they may be formed together as a single integral piece. The upper and lower skin panels 60,61 lie flush with the upper and lower skins 19,20.

Figure 15:
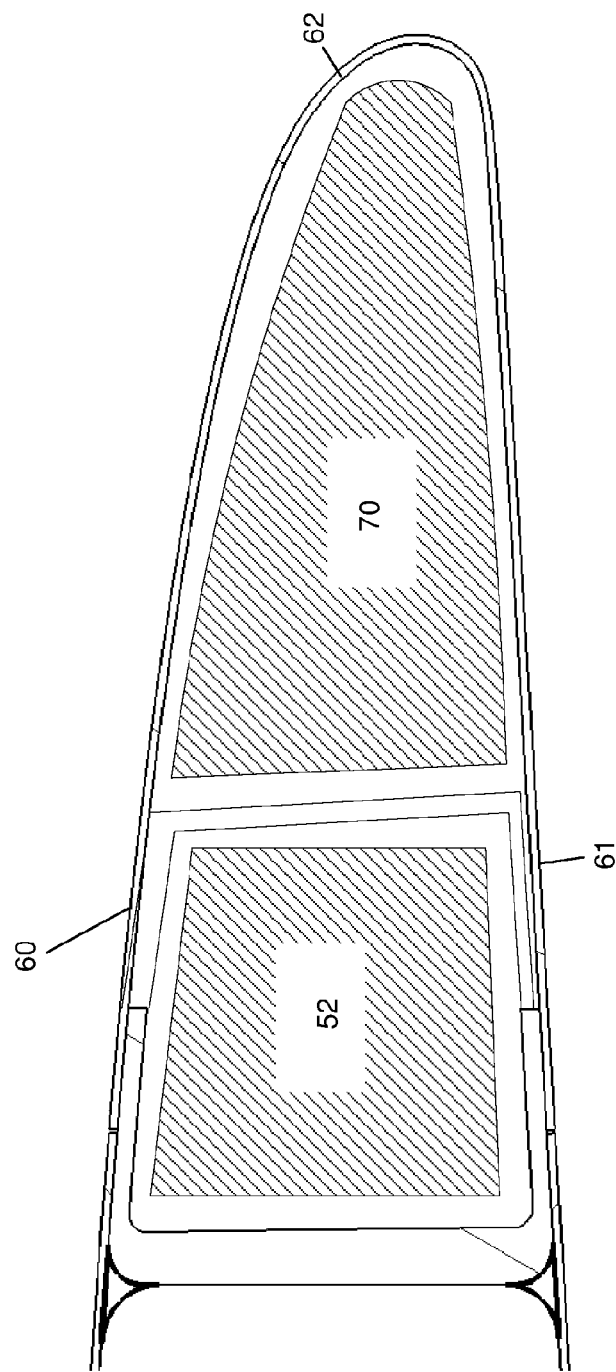
FIG. 15 is a sectional view of an alternative winglet leading edge with a tubular front spar.

Alternatively the leading edge skin may be co-cured to the upper and lower spar caps without fasteners as shown in FIG. 15 A fifth inflatable tool 70 is provided as shown, and during the curing process the forward part of the leading edge skin 60-62 is compacted and cured against this tool 70. The aft parts of the leading edge skin panels 60,61 are compacted against the upper and lower caps of the tubular front spar to which they become co-cured. The tools 52,70 are then removed but the front half of the tubular front spar is not cut away. In the case of FIG. 15 both the main and front spars of the winglet are tubular in the finished article.

Although the invention has been described above with reference to one or more preferred embodiments, it will be appreciated that various changes or modifications may be made without departing from the scope of the invention as defined in the appended claims.

The invention claimed is:

1. A braided composite spar or preform for a braided composite spar, comprising:
   a plurality of tubular plies of braided fibres,
   wherein the spar or preform extends lengthwise from a first end to a second end, and the spar or preform has a tapered portion in which each ply has a height which reduces and a width which increases as the ply extends toward the second end, and
   wherein each ply in the tapered portion has a circumference which reduces as the ply extends toward the second end.

2. The spar or preform of claim 1, wherein each ply in the tapered portion has a circumference which reduces continuously as the ply extends toward the second end.

3. The spar or preform of claim 1, wherein each ply in the tapered portion comprises forward and aft webs joined by upper and lower caps, and wherein for each ply in the tapered portion a height of the webs reduces and a width of the caps increases as the ply extends toward the second end.

4. The spar or preform of claim 1, wherein each ply in the tapered portion has a height which reduces continuously as the ply extends toward the second end.

5. The spar or preform of claim 1, wherein each ply in the tapered portion has a width which increases continuously as the ply extends toward the second end.

6. A winglet comprising a composite spar according to claim 1, wherein the composite spar comprises forward and aft webs joined by upper and lower caps, and the winglet comprises an upper skin joined to the upper cap of the composite spar and a lower skin joined to the lower cap of the composite spar.

7. An aircraft wing comprising a main wing element with a tip; and a winglet according to claim 6 attached to the tip of the main wing element.

8. The wing of claim 7 wherein the composite spar is canted up or down relative to the main wing element.

9. The wing of claim 7 wherein the composite spar is swept forward or aft relative to the main wing element.

10. The wing of claim 7 wherein the main wing element comprises a main wing spar, and the composite spar of the winglet has an inboard portion which overlaps with the main wing spar and is attached to the main wing spar by fasteners.

11. A method of manufacturing a preform for a composite spar according to claim 1, the method comprising:
   forming the preform on a mandrel, wherein the mandrel extends lengthwise from a first end to a second end and the mandrel has a tapered portion in which the tapered portion has a height which reduces and a width which increases as the tapered portion extends toward the second end, and
   wherein the tapered portion has a circumference which reduces as the tapered portion extends toward the second end.

12. The method of claim 11 wherein each ply is formed by feeding a first set of fibres from a first set of bobbins onto the mandrel;
   rotating the mandrel and/or the first set of bobbins to generate a clockwise relative rotation between the first set of bobbins and the mandrel;
   feeding a second set of fibres from a second set of bobbins onto the mandrel;
   rotating the mandrel and/or the second set of bobbins to generate an anti-clockwise relative rotation between the second set of bobbins and the mandrel; and
   traversing the bobbins and/or the mandrel to generate a relative motion between the bobbins and the mandrel so that the first and second sets of fibres are wound onto the mandrel and become intertwined to form a braided structure.

13. A mandrel for manufacturing a preform for a composite spar according to claim 1, wherein the mandrel extends lengthwise from a first end to a second end, and the mandrel has a tapered portion in which the tapered portion has a height which reduces and a width which increases as the tapered portion extends toward the second end, and wherein the tapered portion has a circumference which reduces as the tapered portion extends toward the second end.

\* \* \* \* \*